United States Patent [19]
Liu

[11] Patent Number: 4,618,9
[45] Date of Patent: Oct. 21, 1

[54] FREQUENCY DOUBLING A LASER BEAM BY USING INTRACAVITY TYPE II PHASE MATCHING

[75] Inventor: Kuo-Ching Liu, Setauket, N.Y.

[73] Assignee: Quantronix Corporation, Smithtown, N.Y.

[21] Appl. No.: 724,089

[22] Filed: Apr. 17, 1985

[51] Int. Cl.$^4$ ............................................. H01S 3/10
[52] U.S. Cl. ........................................ 372/22; 372/21; 372/27; 372/98; 307/427
[58] Field of Search ................................... 372/20–22, 372/27, 98; 350/388, 392; 307/427

[56] References Cited

U.S. PATENT DOCUMENTS

| | | | |
|---|---|---|---|
| 4,331,891 | 5/1982 | Rizzo | 307/427 |
| 4,346,314 | 8/1982 | Craxton | 307/427 |
| 4,408,329 | 10/1983 | Ferguson | 372/22 |
| 4,413,342 | 11/1983 | Cohen et al. | 372/98 |
| 4,510,402 | 4/1985 | Summers et al. | 37 |

OTHER PUBLICATIONS

Dmitriev, et al; "Enhancement of the Eff. of Seco Harmonic Generation Inside a Resonator"; Sov. J Quant. Elect. 4(9), Mar. 75, p. 1083.

Primary Examiner—Leon Scott, Jr.
Attorney, Agent, or Firm—Kane, Dalsimer, Kane, Sullivan and Kurucz

[57] ABSTRACT

A frequency doubler for a laser is disclosed in whic Type II SHG crystal is oriented to generate a sec harmonic frequency beam in response to the orthogo components of a fundamental beam. After the fur mental beam makes a round trip through the SHG c tal, any differential phase delays between the ortho nal components due to birefringence are eliminated improve the efficiency of the cavity.

12 Claims, 2 Drawing Figures

FREQUENCY DOUBLING A LASER BEAM BY USING INTRACAVITY TYPE II PHASE MATCHING

BACKGROUND OF THE INVENTION

1. Field of the Invention

The field of the invention concerns a frequency-doubled laser, and in particular a method and apparatus for generating a frequency doubled beam using Type II phase-matching in an intracavity second harmonic generation crystal.

2. Description of the Prior Art

Second Harmonic Generation (SHG) provides a means of doubling the frequency of a laser source. In this process, a fundamental electromagnetic wave in a nonlinear medium induces a polarization wave with a frequency that is double that of the fundamental wave. Because of dispersion in the refractive index of the medium, the phase velocity of such a wave is a function of its frequency, so the phase of the induced second harmonic polarization wave is retarded from that of the fundamental wave. Since the vector sum of all the generated second harmonic polarizations yields the SHG intensity, the intensity is limited by the phase retardation. A technique, known as phase matching, is designed to overcome this difficulty by utilizing in uniaxial and biaxial crystals the natural birefringence, i.e. the difference in the phase velocity as a function of polarization, to offset the dispersion effect so that the fundamental and second harmonic wave can propagate in phase.

There are two well known types of phase matching, which employ the polarization vectors of the incident fundamental wave in different ways.

In Type I phase matching, the fundamental wave is polarized perpendicular to the crystal's optic axis (an O or ordinary ray) and the induced Second Harmonic wave is polarized parallel to the optical axis (an E or extraordinary ray). (A method utilizing Type I phase matching is described in U.S. Pat. No. 4,413,342.) Since the fundamental wave is polarized along the optic axes of the crystal, there is no change in its linear polarization when it exits from the crystal. An intracavity Type I SHG arrangement can easily be adopted to take advantage of the higher power density available within the laser cavity because the introduction of the SHG crystal will not produce a significant polarization loss.

In Type II phase matching, the linearly polarized fundamental wave is equally divided into O and E rays by requiring its polarization to be 45° with respect to the optic axis of the crystal; the output second harmonic wave which results is linearly polarized parallel to the optic axis (an e ray). Here, the phase velocities of the O and E rays of the incident fundamental wave are different due to the natural birefringence of the crystal. In general, the linear polarization of this input fundamental wave is turned into an elliptical polarization as it propagates through the crystal. The magnitude of the phase retardation between O and E rays is the product of the index difference in the material and the effective optical path.

When such a Type II crystal is placed inside a laser resonator, this phase retardation can cause serious power loss because the laser's original linear polarization will not in general be properly maintained. One can attempt to compensate this phase retardation using a passive device such as a Babinet-Soleil compensator. However, the retardation is usually dependent up temperature and variations in temperature can be i duced either by the ambient environment or by self-a sorption of the laser radiation (fundamental and/ second harmonic) in the crystal itself. Such passi compensation thus becomes difficult to maintain duri standard laser operation. Due to these problems, Ty II SHG has typically been employed in an extracavi arrangement in which the polarization of the exiti fundamental wave from the SHG crystal is unimpc tant. Of course the advantage that the higher pow density intracavity fundamental wave within the las cavity has in generating second harmonic, is lost.

OBJECTIVES AND SUMMARY OF THE INVENTION

It is a principal object of the invention to overcor the disadvantages of a system using intracavity Type phase matching for SHG by having the effect of bir fringence of the SHG crystal be compensated for upc return passage of the fundamental wave through t SHG crystal.

It is another object of the invention to provide las frequency doubling apparatus with a laser medium which the fundamental beam incident on the laser n dium maintains its original polarization.

A further object is to provide a system in which t output, frequency-doubled beam, has a known polariz tion.

The system includes a laser harmonic generati means for generating the second harmonic frequency the fundamental frequency emitted by the laser, mea for dynamically compensating for any phase lags gene ated in the fundamental beam passing through said h: monic generating means, a first highly reflecting mirr at the fundamental frequency, and a second mirror. T first and second mirrors are positioned to form a cavi for the laser, the harmonic generator and the compe sating means.

BRIEF DESCRIPTION OF THE FIGURES

FIG. 2 shows an alternate embodiment of the inve tion.

DETAILED DESCRIPTION OF THE DRAWINGS

Figure 1:
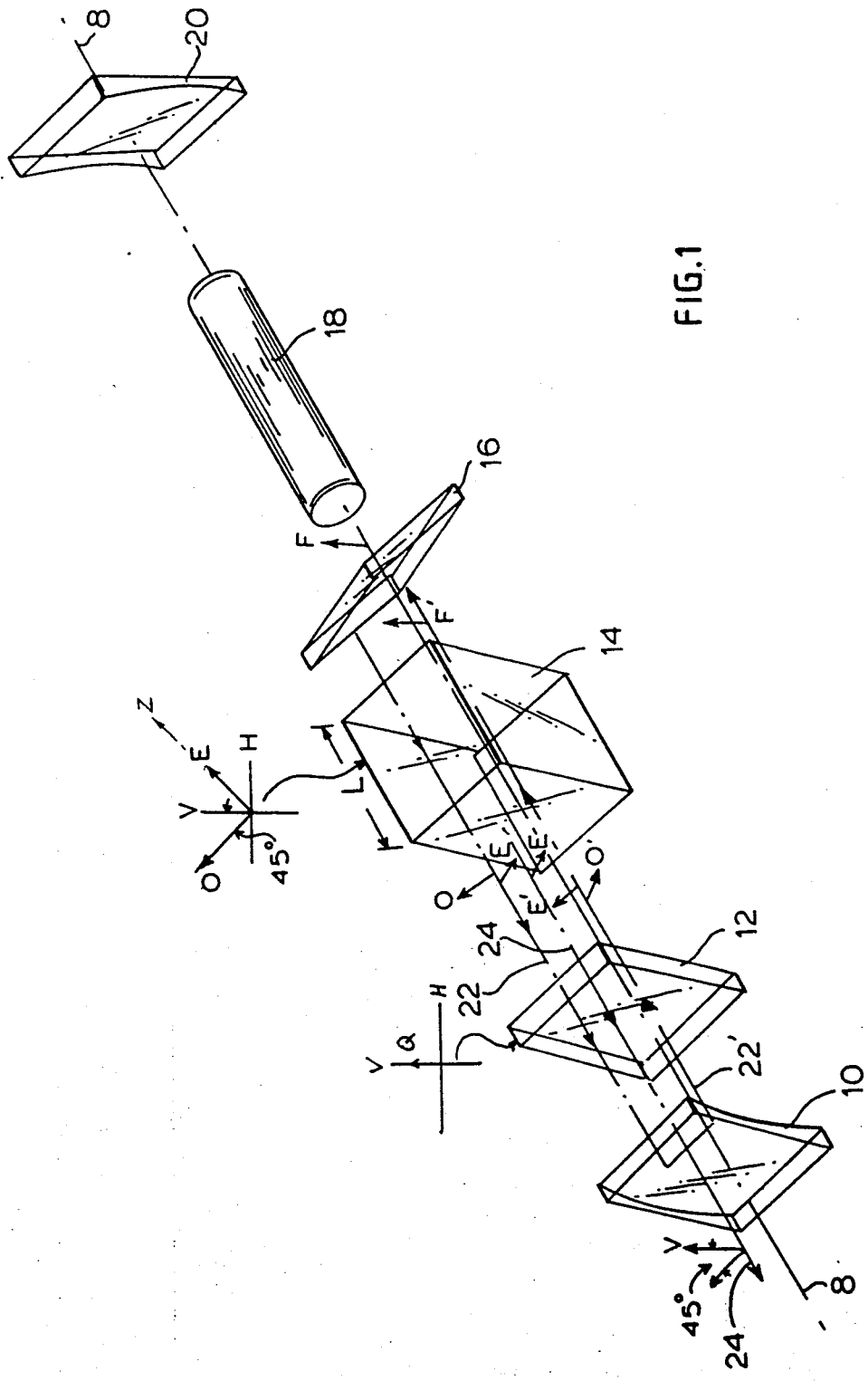
FIG. 1 illustrates a second harmonic laser generat according to this invention.

Referring now to FIG. 1, a frequency doubling la: system comprises the following elements aligned alo a common optical axis 8 as shown: a mirror 10, a quar wave plate 12, an SHG crystal 14, a polarizer 16, active laser medium 18 and a second mirror 20. Laser is adapted to generate a laser beam at a predetermin fundamental frequency along common axis 8. For ample the laser may be a YAG laser which emits a be: at a wavelength of 1064 nm. The active laser medium laser rod, may be included within a pumping reflec with a pumping lamp. These latter laser elements ; well known in the art and therefore have not be shown in FIG. 1 for the sake of clarity.

Crystal 14 is a known second harmonic genera crystal such as a KTP (potassium titanyl phospha crystal. Importantly, crystal 14 is oriented with its op axis, shown by arrow Z in FIG. 1, at an angle of with respect to the angle of polarization of the be from laser 18. Thus, for example, if the fundamer beam F from laser 18 is polarized vertically, then as shown in FIG. 1, the O and E axes of crystal 14 are oriented at an angle of 45° from the vertical.

Plate 12 is selected to operate as a quarter wave plate at the fundamental frequency and simultaneously as a half wave plate at the second harmonic frequency. The optical axis of the plate (or its perpendicular) indicated by arrow Q in FIG. 1 is oriented parallel to the polarization of the laser beam.

Mirror 10 is highly reflective at the fundamental frequency and highly transmissive at the second harmonic frequency. Mirror 20 is highly reflective at the fundamental frequency. Mirrors 10 and 20 are positioned and arranged to form a resonating optical cavity for the fundamental beam generated by active laser medium 18, with the SHG crystal 14 and plate 12 disposed within the cavity.

Polarizer 16 is used to polarize the laser beam in the vertical direction (V).

As this initial beam 22 propagates through the crystal 14, the crystal, in response to both the O and E components of the beam 22 generates a beam 24 having double the frequency of the fundamental beam oriented at 45° to the vertical (an E ray) as shown. Beam 24 is transmitted through plate 12, and mirror 10 out of the cavity. Because plate 12 acts as a half-wave plate, the beam at the doubled frequency is rotated by 90° and is then transmitted through mirror 10. As shown by the arrow it is linearly polarized at 45° to the vertical direction.

As the fundamental beam 22 with its linear polarization oriented at 45° to the Z axis propagates through the SHG crystal, the birefringence causes a phase retardation to occur between fundamental O and E components.

In FIG. 1 it is assumed that after passing through crystal 14, the O component of the fundamental beam 22 lags behind the E component.

In fact obviously, without any phase lag compensatory means, the fundamental beam reflected from mirror 10 and back through the SHG crystal will exhibit twice the phase retardation shown after one pass and the polarization of the beam reentering the polarizer 16 will not in general be linear and vertical, resulting in significant and undesirable polarization loss.

Therefore, in the present invention, beam 22 is passed from SHG crystal 14 through plate 12 which is a quarter-wave plate of the fundamental frequency. In FIG. 1, as previously mentioned, the plate 12 is shown with its optic axis parallel (or perpendicular) to the polarization of the fundamental beam incident on crystal 14. After reflection by mirror 10, the beam 22' passes again through quarter wave plate 12. As a result of the two passes through plate 12, the polarization components of beam 22 have been rotated by 90° so that, as shown in FIG. 1, the orientation of the E and O components of beam 22' are reversed with respect to the orientation of the components of beam 22. However component O still lags behind E. The reflected beam 22' then passes through crystal 14 but this second time, vertical component E is differentially phase shifted by amount identical to the first differential phase shift with respect to O so that the components E and O of the beam 22' as it leaves the crystal 14 are now in phase and combine to yield linear polarization F'. Therefore by interposing plate 12 between crystal 14 and mirror 10, the birefringent effects of the SHG crystal are successfully self-compensated and thereby eliminated.

As a result, the fundamental beam 22 incident on crystal 14 and the fundamental beam 22' exiting from the crystal 14 have identical linear polarizations resulting in no loss in the laser resonator.

Under the conditions described above, the harmonic beam generated within crystal 14 comprises a component $E_D$ at 45° to the vertical as shown. Since in many applications it is desirable to obtain a frequency-doubled laser beam of a known linear polarization, plate 12 is constructed to act simultaneously as a half-wave plate at the second harmonic frequency thereby rotating beam 24° by 90°. If plate 12 were unspecified at the second harmonic frequency, the frequency doubled beam would have an arbitrary elliptical polarization. As a result, beam 24 exiting from the optical cavity is linearly polarized along the ordinary axis as shown.

It should be appreciated that plate 12 and crystal 14 accomplish their intended purposes dynamically. In the present invention, the phase lag is automatically and accurately corrected regardless of the temperature of the crystal.

Another embodiment of the invention is shown in FIG. 2. In this embodiment, the frequency doubled laser comprises a three-mirror cavity with a mirror 112, an SHG crystal 114, a quarter-wave plate 116, a second mirror 118, a third mirror 120, a laser active medium 110 and a plarizer 128. The laser 110, the crystal 114 and quarter wave plate 116 and polarizer 128 function in a manner identical to their counterparts in the embodiment of FIG. 1. Mirror 120 is highly reflective at the fundamental frequency, mirror 112 is highly reflective at the fundamental frequency and highly transmissive at the second harmonic frequency. In addition mirror 112 is also positioned and arranged to focus the output of laser 110 on crystal 114 for effective second harmonic generation. Mirror 118 is highly reflective at the fundamental frequency and at the second harmonic frequency.

In operation, a fundamental beam 122 produced by laser active medium 110 is reflected and focused by mirror 112 on crystal 114. The crystal generates a polorized second harmonic beam 124. After propagation through crystal 114, the O and E components of fundamental beam 122 are phase shifted with respect to each other as described in the previous embodiment. Also, as in the previous embodiment, the fundamental frequency quarter-wave plate 116 and mirror 118 are used to rotate the O and E components by 90° after reflection so that passage of beam 122' back through crystal 114 puts all components back in phase and restores the polarization to that linear polarization which initially left laser active medium 110. On the return trip through crystal 114, beam 122' generates second harmonic beam 126, which is colinear with reflected second harmonic beam 124'.

Thus, in this embodiment, the second harmonic generated on the return trip of the fundamental is not lost so the potential exists for a second harmonic power gain of a factor of two. Interference may occur between these beams which will affect the stability of the SHG output intensity. In order to overcome this undesirable effect, the polarizations of the beams 124' and 126 are made orthogonal using a technique similar to that described in U.S. Pat. No. 4,413,342. Plate 116, is simultaneously made a quarter-wave plate at the second harmonic frequency. Beam 124 will, upon passage through 116, reflection from 118 and return through 116, have its polarization rotated by 90° and thereby be orthogonal and non-interfering with beam 126. Beams 124' and 126 are then coupled out of highly transmissive mirror 112.

Beam 122', after passing through crystal 114 is reflected by mirror 112 toward laser 110. Mirror 120 completes the optical cavity. Plate 116 compensates for the phase shift in the O and E components of the fundamental beam as previously described thereby insuring that beams 122 and 122' have the same linear polarization.

Obviously numerous other modifications may be made to the invention without departing from its scope as defined in the appended claims.

What is claimed is:

1. A frequency-doubled laser comprising:
   first and second mirrors forming an optical cavity therebetween;
   a laser active medium disposed within said cavity for generating a fundamental beam at a preselected fundamental frequency and having a linear polarization which can be resolved into two orthogonal components;
   a crystal for generating via Type II phase-matching a linearly polarized second harmonic beam in response to said fundamental beam, said crystal having an ordinary and an extraordinary axis, said orthogonal components of said fundamental beam being oriented along said axes, said crystal further generating a differential phase delay between said orthogonal components; and
   means for eliminating on the return trip through said crystal said differential delay to produce a frequency doubled output beam.

2. A frequency doubled laser comprising:
   a first mirror;
   a laser active medium for generating a fundamental beam at a preselected frequency and having a linear polarization resolved into two orthogonal components;
   a crystal with its optic axis at an angle of 45° with respect to said preselected linear polarization having an ordinary and an extraordinary axis oriented along said orthogonal components to generate a second harmonic beam in response to both orthogonal components, said crystal further generating a differential phase delay between said orthogo(nal) components;
   means for interchanging the respective orientati(on) of said orthogonal components to eliminate (on) return passage through said SHG crystal said (dif)ferential delay; and
   a second mirror, said first mirror and second mir(ror) being arranged to form a an optical cavity for s(aid) laser active medium, crystal and interchang(ing) means.

3. The frequency doubled laser of claim 2 where(in) said interchanging means further maintains the lin(ear) polarization of the second harmonic beam.

4. The frequency doubled laser of claim 2 where(in) said interchanging means is a plate positioned for d(ual) passes of the fundamental beam to exchange the or(di)nary and extraordinary components of the fundamen(tal) beam before said fundamental beam reenters the cryst(al).

5. The frequency doubled laser of claim 4 where(in) said plate is a quarter wave plate at the fundamen(tal) frequency.

6. The frequency doubled laser of claim 5 where(in) said plate is a half-wave plate at the second harmon(ic) frequency.

7. The frequency doubled laser of claim 2 where(in) said second mirror is highly reflective at the fundame(n)tal frequency.

8. The frequency doubled laser of claim 7 where(in) said second mirror is highly transmissive at the doubl(ed) frequency.

9. The frequency doubled laser of claim 2 furth(er) comprising a third mirror for focusing the fundament(al) beam on said crystal.

10. The frequency doubled laser of claim 9 where(in) said third mirror is further provided for coupling sa(id) second harmonic beam out of said cavity.

11. The frequency doubled laser of claim 9 wherei(n) said interchanging means for the fundamental orthogo(o)nal components also interchanges the second harmon(ic) frequency components to preclude interference.

12. The frequency doubled laser of claim 9 wherei(n) said interchanging means is a quarter-wave plate at th(e) fundamental frequency and a quarter-wave plate of th(e) second harmonic frequency.

* * * * *